Patented Aug. 26, 1941

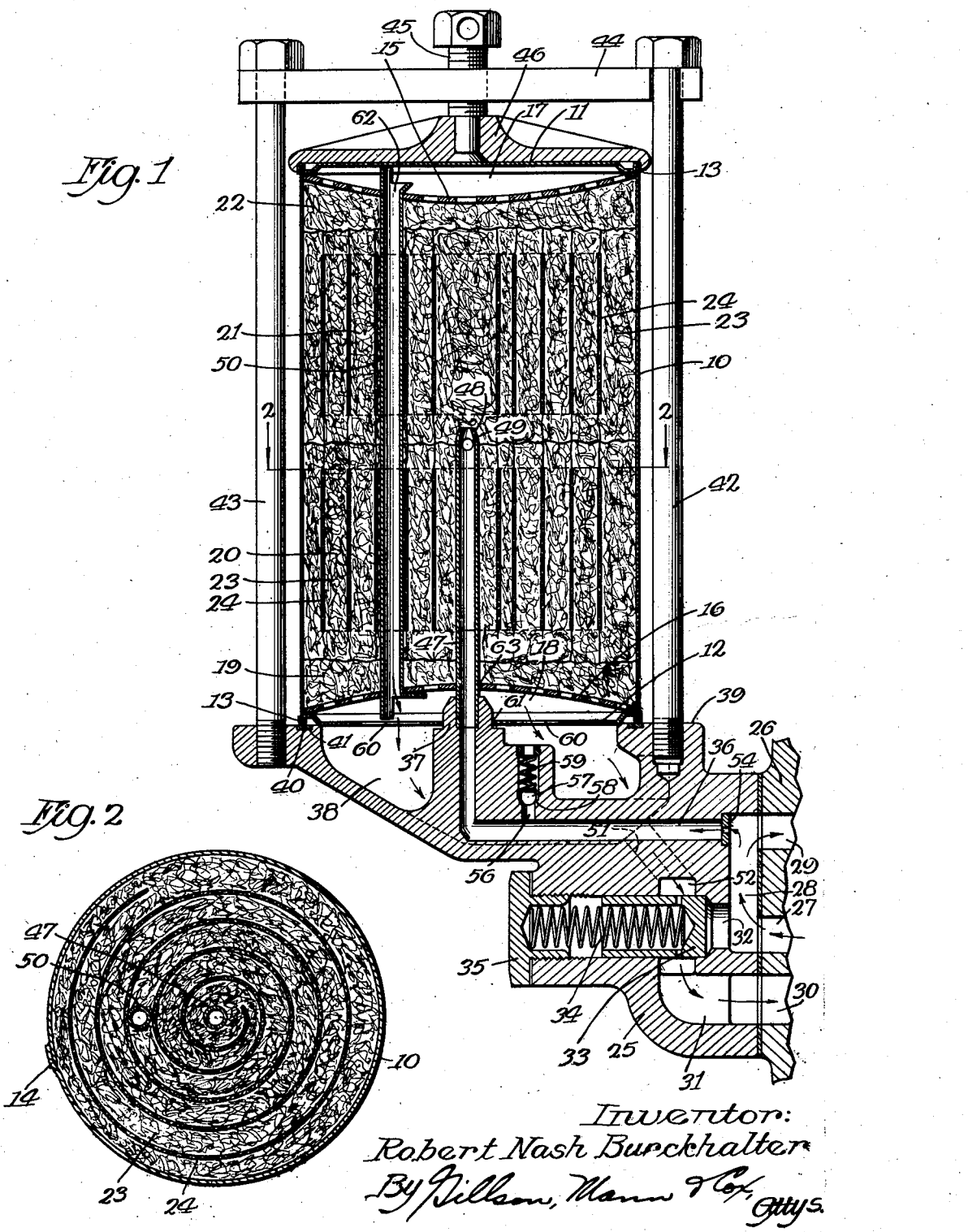

2,253,684

UNITED STATES PATENT OFFICE 2,253,684

FILTER

Robert Nash Burckhalter, Michigan City, Ind., assignor to Michiana Products Corporation, Michigan City, Ind., a corporation of Indiana Application March 18, 1937, Serial No. 131,558

6 Claims. (Cl. 210—131)

A mass of shredded cotton or "cotton waste," wool, a mixture of wool and cotton, or cattle hair and cotton, or cattle hair and asbestos fiber, or cotton and mineral wool, or various other fibrous materials, when put under sufficient pressure to make the mass somewhat springy while dry is a good filter for lubricating oil, such as commonly used in internal combustion engines, apparently because it affords plentiful passages for oil, making it highly permeable, but has also manifold obstructions to catch and hold entrained solid and other foreign matter. But in use the mass packs or shrinks in the direction of flow, thereby reducing its permeability, and this, with the accumulation of solids and other foreign matter at all near the surface where the oil enters, gradually changes it from a thick or deep permeable filter of high capacity to a thin or surface filter of low capacity and short life.

The principal object of this invention is to prevent this transformation and preserve the original characteristics of the filter through a long period of service. This is accomplished by making the filter in layers of shredded cotton or other fibrous material or mixtures lying in the direction of flow and alternating with layers of friction material, such as woven wire or other reticulated metal, with the whole under sufficient pressure crosswise to the direction of flow (and therefore overcome the tendency to move under the oil pressure) to substantially prevent packing and preserve the relatively high permeable character of the original material until it becomes fairly charged with filtrate.

Such a filter may be made in a variety of ways and shapes and from a variety of materials.

The preferred form for contemporary automotive vehicles is shown in the accompanying drawing, in which Fig. 1 is a vertical section through a filter assembly secured to the side of an engine casing, and Fig. 2 is a transverse section on the line 2—2 of Fig. 1.

But this specific illustration and the corresponding description are used for the purpose of disclosure only, and it is intended that the substance of the invention embodied in various other forms shall be covered by the claims.

The filter casing, as shown, includes a cylindrical barrel 10 of sheet metal having upper and lower heads 11 and 12 crimped about the ends of the barrel, as indicated at 13, and soldered, welded, or otherwise made fast and oil-tight. The barrel is shown with a lapped soldered joint 14.

Just inside the heads 11 and 12 are perforated or reticulated heads 15 and 16 concavo-convex in shape and of a diameter approximately equal to the inside diameter of the barrel 10. These heads cooperate with the heads 11 and 12 to form small chambers 17 and 18. Between the heads 15 and 16 is the filter element composed of layers of fibrous material and woven wire, expanded metal or such like. The fibrous material should be selected according to the conditions of use, and for internal combustion engines, shredded cotton is preferable as a rule, though individual engineers may wish to make use of a variety of other materials and mixtures of materials.

The filter element is really made up of several elements or sections 19, 20, 21 and 22. The sections 19 and 22 are layers of shredded cotton under just sufficient pressure to make them slightly springy. The sections 20 and 21 are rolls or spiral layers of shredded cotton 23 and woven wire 24. They may be made by spreading out the cotton roughly in the form of a flat sheet or layer, placing on top a sheet of woven wire of somewhat less length and leaving practically all of the excess length of cotton at one end, then placing a small amount of cotton on the wire at the opposite end and rolling the layers into approximately cylindrical form, as will be best seen from the section in Fig. 2. The pressure will be about right when the mass can be inserted in the barrel with just enough force to make it become somewhat springy.

No actual dimensions, pressures or materials suitable for all uses can be given, but for a barrel about four and one-quarter inches in diameter, a thickness of cotton layer of three-eighths to one-half inch will be about right and three mesh screen made with 00 gauge of galvanized wire has been found satisfactory. The lateral pressure as well as the endwise pressure may be varied within considerable limits, but for high permeability and long life of the filter, the fibers should be in a somewhat loose open condition to provide for easy flow of oil while obstructing all of the entrained material. A depth of cotton of about two inches in the direction of flow is satisfactory, though of course, this can be varied. The fibers should be in loose enough condition to let the solid matter actually enter the mass and gradually work its way toward the outlet end, otherwise the permeability is correspondingly reduced and a larger area is required for a given flow of oil. When solid matter begins to escape the outlet end of the filter, that marks the end of usefulness of the filter and it should be replaced.

Such filters can be mounted in a great variety of ways and deference will have to be made to the desires of layout men and engineers. In the present instance the filter is shown on a base 25 bolted to the side of the engine casing 26.

The engine casing has an oil passageway 27 leading from the oil pump to a cored passage 28 in the base in communication with another oil passage 29 in the engine casing leading to the bearings. There are also communicating oil passages 30 and 31 in the engine casing 26 and the base 25 respectively, leading back to the oil pan or other chamber of supply.

A by-pass 32 connects the passage 31 with the cored passageway 28, and a pump limiting valve 33, constantly urged to its seat by a spring 34 compressed by a cap 35, will establish communication from the pump line 27 to the return line 30 when the desired pressure on the bearings is reached.

The base 25 has an inlet passage 36 leading from the upper end of the passage 28 inwardly and then upwardly to a nipple 37 surrounded by a sump 38. The wall of the sump 38 has an upper face 39 provided with a groove 40 filled with packing 41 and adapted to make a seal with the rim formed by turning over the edge of the lower head 12 of the filter casing. The seal is actually preserved by a clamp including bolts 42 and 43 screwed into the base and fitted into slots in the cross bar 44 equipped with a bolt 45, swiveled to a cap 46 that will be pressed against the upper head 11 of the filter casing when the bolt 45 is properly screwed down.

An inlet tube 47 is pressed into the nipple 37 and extends through the perforated head 16 and up into the intermediate portion of the filter mass where it is slightly constricted at 48 and transversely drilled at 49 to make a free outlet for oil. The drilling 49 is intended to be at about the juncture of the units or sections 20 and 21.

The chambers 17 and 18 at each end of the filter casing are here shown connected by a tube 50 extending through the filter element, although, of course, it may be placed elsewhere. But the arrangement shown is very convenient.

There is an outlet passage 51 in the base 25 connecting the sump 38 with a counterbore 52 surrounding the pump limiting valve 33 and communicating with the passage 31 leading back to the return passage 30 in the engine casing.

Oil to be filtered is taken off at the line leading to the bearings and flows in a shunt or parallel circuit. It leaves the cored passage 28 to the left, in Fig. 1, through the passage 36 into the tube 47 and is delivered to the middle of the filter element. There it spreads out laterally and flows both upwardly and downwardly. The oil flowing downwardly passes through the openings in the head 16 into the chamber 18 and then into the sump 38. The oil flowing upwardly passes through the perforations in the head 15 into the chamber 17, then flows through the tube 50 to the chamber 18 and into the sump. From the sump the filtered oil goes out through the passage 51, the passages 31 and 30 to the casing.

A desirable economy can be effected by making the filter casing of very light material, for example, 135 pound tin plate which is about .01539 inch in thickness or approximately 28 gauge. A casing made of that material can be bought very cheaply and serves the purpose well, provided the internal pressure is kept within low limits. For example, in the construction described it should not exceed 30 pounds or there is danger of opening a seam.

In order to insure that limit of pressure within the filter casing, the inlet 36 for oil to the filter is restricted by a disk 54 threaded or pressed in position, as shown in Fig. 1.

In this illustrative construction the inlet 36 is one-quarter inch in diameter and is restricted by a disk 54 screwed or pressed in place and having an opening one-sixteenth inch in diameter, whereas the outlet passage 51 is three-eighths inch in diameter to insure a free flow back to the engine casing. Of course, with this construction, cold oil or a clogged filter element could cause a high pressure within the chamber. For that reason, a relief passage 56 connecting the inlet passage 36 with the sump 38 is provided with a ball valve 57 urged to its seat 58 by a spring 59 with just sufficient pressure to let the valve open when the pressure in the casing 10 reaches about thirty pounds. Oil will then flow from the inlet passage 36 through the relief passage 56 to the sump and prevent any further rise of pressure within the filter casing. This relief passage and valve must be distinguished from by-passes across the filter that have been heretofore used to insure a flow of oil, even though the filter is cold or clogged, for such passages will permit pressure to develop in the filter casing of one hundred pounds or more, which would be too much for a casing of the construction preferred for economy.

The filter shown and described can be assembled in a variety of ways. The casing can be bought with the head 12 secured to the barrel 10 and provided with one or more lateral openings 60 and a central opening 61 to receive the nipple 37. With such a sub-assembly the head 16 is first inserted, the lower section of filter material 19 worked in uniformly and followed by the sections 20, 21 and 22 in order. An air jet is then inserted through one of the openings 60 to make a suitable hole and tube 50 is pushed in from below, its lower end having been previously upset to form a flange. The head 15 is then put in place and if there is sufficient filter mass present a little pressure on this head will be required to get it into position. Nine ounces of cotton waste is about the right quantity for a filter casing four and one-half inches in diameter and six and five-eighths inches long. With a suitable tool, the upper end of the tube 50 is upset or bent at 62 to make it fast, the head 11 is then put in place, crimped over and made fast to the barrel 10 by soldering, welding or otherwise.

An air jet pilot should be inserted through the central opening 63 in the head 16 to make a hole for the tube 47 and that hole may be preserved by inserting a pin until the filter is to be actually installed. When that is to be done the pin is withdrawn, the filter is pushed down over the tube 47, the cap 46 is put on and the clamp is set up. The tube 47 in the opening 63 of the head 16 centers the casing on the hose and seats the run on the packing 41.

Due to the woven wire layers 24, the filter elements 20 and 21 will maintain their size and characteristics through a long period of service and any shrinkage in the sections 19 and 22 will not materially change the capacity or the character of the filter.

The arrangement permitting flow in two directions is preferred but those favoring flow in a single direction will readily make the necessary changes without departing from the spirit of the invention.

I claim as my invention:

1. In a device of the class described, a filter including a base, a casing of light gauge sheet metal construction having imperforate top and side walls and a perforated bottom wall seated on said base, clamping means for removably holding said casing on said base, filter material permanently contained within said casing for filtering oil for the bearings of an internal combustion engine, an inlet for said casing for conducting oil to said filter material, an enlarged outlet for said casing for conducting the oil from said casing after the same has passed through said filter material, an oil pressure line for conducting oil directly from an oil reservoir to said bearings, a by-pass return conduit between said oil pressure line and said reservoir, a relief pressure valve in said by-pass return conduit and adapted to open for shunting oil in said line back to said reservoir when the pressure in said line rises above a predetermined amount, an intake passage in communication with said inlet and with said oil pressure line, a restriction within said passage for greatly restricting the flow of oil from said line to said filter, a discharge passage in communication with said outlet for conducting oil from said filter back to said reservoir, a second by-pass between said intake passage and said discharge passage, said last named by-pass being located between said filter and said restriction and having a low resistance to the flow of oil therethrough, a pressure relief valve within said last named by-pass and adapted to open for by-passing oil around said filter when the pressure within said filter rises above a predetermined amount, for protecting said casing against excess pressure.

2. In a device of the class described, a filter comprising a casing of light construction, filter material permanently contained within the casing, a base for the filter casing, clamping means for removably securing said casing on said base, said base having inlet and enlarged outlet passages for the filter casing for conducting oil to and from said filter and to and from an oil reservoir in the engine casing said oil passing through said filter in flowing from said inlet to said outlet passages, a main oil line for supplying oil to said inlet passage, means including a relief valve within said base for conducting oil from said main oil line into said outlet passage when the pressure within said main oil line rises above a predetermined amount, means comprising a disk having a restricted aperture therethrough within said inlet passage within said base for limiting the flow of oil to said filter casing, means, including a by-pass within said base and a pressure relief valve within said by-pass, between said disk and filter for by-passing oil around said filter from said inlet passage for limiting the pressure on the filter casing to a predetermined maximum much below that capable of being developed in said main oil line, said by-pass having a low resistance to flow of oil.

3. In an internal combustion engine having a crank case provided with a boss having three openings therethrough, a base having a sealing face provided with a groove therein forming with two of said openings a portion of a continuous passage for conducting oil from the crank case to the engine bearings, a filter casing of light sheet metal having inlet and outlet openings at one end and a sealing rim seated on said sealing face, means for removably clamping the casing to the base, filter material within the casing, a discharge passage within said base in communication with said outlet opening and forming with the third opening in said boss an enlarged discharge passage for said filter, a by-pass in said base for conducting oil from said continuous passage to said discharge passage, a pressure operated spring pressed valve in said by-pass adapted to open when the pressure within said continuous passage rises above a predetermined amount, an intake passage for conducting oil through said continuous passage to the inlet opening of said filter, a restriction within said intake passage having a great resistance to flow of oil therethrough, a relief passage for conducting oil from said intake passage to said discharge passage, said relief passage being between said filter and said restricted passage and having a low resistance to flow of oil, a spring pressed relief valve within said relief passage for relieving the pressure of oil in said filter when the same rises above a predetermined amount.

4. In a device of the class described, a base member having intake and discharge passages therein, a main oil line for supplying oil to said intake passage from an oil reservoir, a filter member removably mounted on said base and having an inlet and an outlet in communication with said inlet and discharge passages, respectively, said discharge passage receiving oil after it has passed through said filter member and conducting the same directly to said reservoir from said filter, a disk mounted in said intake passage and having a small bore therethrough for admitting oil to said filter member directly from said main oil line, means for relieving pressure within said main oil line, a by-pass within the base between said intake and discharge passages and having a low resistance to flow of oil, and a spring pressed relief valve within said base member in said by-pass, said by-pass and relief valve being between said small bore and said filter member whereby when the pressure within said filter member exceeds a predetermined amount, said valve will open and by-pass oil around said filter member without affecting the pressure in said main oil line.

5. In a device of the class described, a filter element comprising a pair of vertically spaced spirals of reticulated metal with fibrous material between adjacent parts of each spiral, a layer of fibrous material between said spirals, a layer of fibrous material above and below said pair of spirals, an inlet passage terminating in the layer of fibrous material between said spirals, and a pipe spaced from said inlet passage and extending entirely through said layers of fibrous material and spirals and having impervious walls.

6. In a device of the class described, a base, a filter casing supported on said base, a filter element within said casing, said element comprising an upper and a lower section each consisting of thick layers of fibrous material alternating with layers of reticulated metal arranged lengthwise to the direction of flow through the element and under pressure crosswise to the direction of flow through the element, an intermediate section comprising a layer of fibrous material between and in contact with said upper and lower sections, a layer of fibrous material resting on said upper section, a layer of fibrous material beneath and in contact with the lower section, an intake tube extending from said base axially into said casing and terminating in the intermediate section of said filter element, a tube extending entirely through the filter element laterally of the intake tube, and means for clamping said casing to said base.

ROBERT NASH BURCKHALTER.